United States Patent Office 3,496,157
Patented Feb. 17, 1970

3,496,157
TWO STAGE PROCESS FOR THE PRODUCTION OF POLYETHYLENE OF HIGH MOLECULAR WEIGHT AND HIGH CRYSTALLINITY
Enrico Cernia, Arturo Rio, and Natale Ercoli Malacari, Rome, Italy, assignors to Societa Asfalti Bitumi Cementi e Derivati, S.p.A., Rome, Italy, an Italian corporation
No Drawing. Continuation-in-part of application Ser. No. 242,624, Dec. 6, 1962. This application Oct. 24, 1966, Ser. No. 588,765
Claims priority, application Italy, Dec. 9, 1961, 22,009/61; Nov. 14, 1962, 22,103/62, 22,104/62, 22,105/62
Int. Cl. C08f 1/11, 1/60, 3/04
U.S. Cl. 260—94.9   6 Claims

ABSTRACT OF THE DISCLOSURE

Polyethylene of high molecular weight and a high degree of crystallinity is produced by a two stage process. In the first stage, ethylene is dispersed in an aqueous solution containing a free radical polymerization initiator having an activation energy of 15 to 25 kg./mol at a temperature of 60 to 95° C. and a pressure of 300 to 400 kg./cm.² Either the initiator employed contains a hydrophilic group or an additional substance having a hydrophilic group is added to the solution. In the second stage, which requires a longer period of time than the first stage, the dispersion is maintained at a lower temperature and at a higher pressure.

---

This is a continuation-in-part of application Ser. No. 242,624, filed Dec. 6, 1962 and now abandoned.

It is well known that the radical polymerization of certain olefines requires very high pressures and high temperatures. In the case of ethylene in fact, the so-called "high pressure" industrial processes which generally use oxygen as an initiator take place at pressures from 1500 to 2000 atmospheres and temperatures from 200 to 250° C. The latter factor determines to a great extent chain transfer phenomena between polymer and monomer, which leads to the formation of branched polyethylenes, possessing poor crystallinity, a low softening point, and inferior rigidity and general mechanical properties.

The use of radical initiators having a low activation energy, which allow polymerization to take place at much lower temperatures than those quoted above, tends to reduce substantially the above mentioned phenomena of chain transfer and results in the production of polymers having a higher density, greater crystallinity and, therefore, also mechanical properties considerably superior to those of polymers produced by the traditional high pressure system. However, the use of these types of initiators cannot only lend to low polymerization yields, but can also make it necessary to bring about an even dissipation of the heat of polymerization, which may be effected by carrying out the polymerization in the presence of a solvent or an emulsifying agent. The use of solvents as heat dissipators also makes possible very large chain transfer effects between the growing polymer chains and the molecules of the solvent, which usually causes a lowering in the speed of polymerization and above all substantial decreases in the molecular weight of the polymers obtained, along with the technical difficulty of eliminating the solvent itself. When an emulsifying agent is used, a certain amount of the same becomes incorporated in the polymer produced, with an adverse effect on the properties of the latter.

According to the present invention, it has been found that if the polymerization of olefines in general and of ethylene in particular is carried out in bulk and by the use of initiators having low activation energy, in a medium in which both the olefine and the resulting polymer are practically insoluble, so as to give a more or less uniform suspension or dispersion, and with the use of a hydrophilic substance and in the two particular stages as hereinafter described, the polymerization can be carried out at much lower temperatures than those traditionally used and will take place very steadily and evenly, permitting the dispersing medium to dissipate very easily the heat produced during polymerization, whereby there are obtained polymers of extremely high molecular weight and which are highly pure and, in the case of ethylene polymers, which are highly crystalline and have excellent mechanical and heat-resisting properties. According to one aspect of the present invention, by dispersing ethylene, or ethylene in the form of an inclusion compound with water (hydrate), in a medium in which it is practically insoluble and therein conducting the polymerization in the presence of particularly active initiators the temperatures at which the polymerization takes place are such that chain transfer effects are limited, so that polymers very similar to those produced by the so-called "low-pressure" processes are obtained. It is found that highly active initiators, or mixtures of or including the same, which are completely or partially soluble in the dispersed or in the dispersing phase may be used, and give very high transformation yields. The best results, however, are attained when the initiator is at least partially soluble in the dispersing phase.

In particular, the present invention constitutes the polymerization of ethylene according to the following two stage procedure. For the first stage there is provided a dispersion of ethylene in water, containing a free radical initiator having a low activation energy and a substance having strongly hydrophilic groups. The free radical initiator preferably has an activation energy in the range of 15 to 25 kcal./mol. If desired, rather than a separate free radical initiator and a separate substance having strongly hydrophilic groups (i.e., polar groups), thereby may be used a single substance having both of these characteristics. In the first stage, the dispersion is heated to a temperature in the range of 60 to 95° C., while under a pressure in the range of 300 to 400 kg./cm.², for a period in the range of 2 to 20 minutes, whereby there is obtained a low molecular weight "prepolymer" of ethylene having hydrophilic groups acquired from the aforementioned substance having such groups and randomly attached to the polymeric chain. The prepolymer is in the form of a very fine dispersion in the water. Ethylene (i.e., the monomer) is very highly soluble in the prepolymer and, accordingly, the remaining unpolymerized ethylene is dissolved in the prepolymer phase of the dispersion. In the second stage, the prepolymer dispersion is heated to a lower temperature than the first stage, in the range of 40 to 60° C., while under a higher pressure than the first stage, in the range of 500 to 600 kg./cm.², for a longer period than the first stage, in the range of 30 to 150 minutes, whereby there is obtained, with a high conversion yield, polyethylene having a very high molecular weight (at least about 80,000 and generally from about 100,000 to 300,000)

and a high degree of crystallinity. Within the foregoing ranges, preferred conditions for the first stage are temperatures of 65 to 75° C., pressures of 350 to 400 kg./cm.$^2$ and reaction times of 5 to 15 minutes and for the second stage are temperatures of 40 to 55° C., pressures of 550 to 600 kg./cm.$^2$ and reaction times of 60 to 120 minutes. The dispersion preferably is subjected to rapid stirring or other mechanical agitation during both stages.

The selection of the free radical initiator is determined only by its having a low activation energy. Typical free radical initiators which may be used in the present invention are phenyl-acetyl peroxide, cyclohexane sulphonyl-acetyl peroxide, isopropyl carbonate-peroxy-sodium sulphonate, alkyl- and dialkyl-peroxy-carbonates such as di-isopropyl-peroxy-carbonate, isopropyl - peroxy - carbonate and ethyl-peroxy-carbonate, and dialkyl-peroxy-dicarbonates such as di-isopropyl-peroxy-dicarbonate and di-ethyl-peroxy-dicarbonate. The amount of free radical initiator employed is simply such amount as in conventional for free radical polymerizations, such as 0.01 to 0.10 mol percent based on the ethylene (i.e., 0.01 to 0.10 mol per 100 mols of the ethylene).

The substance having strongly hydrophilic groups may be any such substance which is water soluble. Such substances are per se well known and are typified by polyethylene polyamines such as diethylene triamine, polypropylene polyamines such as tripropylene tetra-amine, polyacrylic acid, partially hydrolyzed polyvinyl acetate and polyvinyl alcohol. If there is selected a low activation energy initiator having strongly hydrophilic groups then a separate substance having strongly hydrophilic groups, while preferred, is not necessary. Typical initiators of this latter type are alkyl-peroxy-carbonates, dialkyl-peroxy-dicarbonates, and isopropyl carbonate-peroxy-sodium sulphonate. Other such initiators are obvious to those skilled in the art. It is preferred that the amount of a non-initiating substance having strongly hydrophilic groups employed be in the range of about 5 to 20 mols per million mols of the ethylene. Moreover, it is to be understood that this substance is not employed in such porportion as to form with the ethylene a copolymer identifiable as such by its physical and mechanical properties but only in such proportion as to provide sufficient hydrophilic groups on the polymer chain to render the polymer dispersible, at least with rapid agitation.

Although the interpretation of the kinetics of the polymerization, where the initiator used is soluble and the olefine practically insoluble in the dispersing agent, appears somewhat complicated to explain, it is not improbable that the formation of free radicals takes place in the interface causing an initiation which in turn may continue in the dispersed phase (gaseous or liquid) of the monomer.

It must be noted, however, that from a practical point of view, especially if the polymerization is carried out at a relatively high pressure and/or temperature, a certain amount, though very limited, of the olefines will dissolve. For example, at the above specified pressures, small quantities of ethylene may dissolve in the water, and in this case the formation of polymers in solution, having much lower molecular weights due to the above mentioned phenomena of chain transfer with the solvent, may take place to a minor extent alongside the bulk polymerization. The resulting polymer may, but does not necessarily, have a relatively wide distribution of molecular weights which may prove detrimental for certain uses. The polymers, nevertheless, are in general of the nature specified above, being in effect, only slightly contaminated with lower molecular weight of substantially non-linear and therefore non-crystalline polymer.

According to another feature of the present invention, it is found that if, in addition to the conditions described above, a substance is dissolved in the dispersing medium which limits even further any partial dissolving of the olefine (e.g., ethylene), rendering such a phenomenon negligible, the polymerization in the dispersed phase is more complete still, with a more even distribution of molecular weights in the resulting polymer and a more highly crystalline resulting polymer. The substance dissolved in the dispersing medium, in order to fulfill the function described above, must not inter-act with the monomer, nor must it cause harmful effects of the catalyst on the monomer in the initiation phase, but on the contrary, if possible it should lead to an improvement in the form of a more rapid formation of free radicals by the catalyst. Water soluble mineral salts in general are found to be satisfactory. Preferred are water soluble salts of alkali or alkaline earth metals. Other suitable salts may be routinely determined. Any quantity of salts up to the saturation point may be used. In general, the greater the dissolved salt concentration in the water phase, the lesser the monomer solubility therein.

With regard to the problem that the use of too low polymerization temperatures, even with initiators having low activation energy, may result in rather low monomer to polymer transformation yields, it has been found according to the present invention that if the polymerization is carried out at variable temperatures, that is, higher at the beginning of a short period of time, and such that the combination of this temperature and the praticular initiator and monomer used does not result in the formation of appreciable quantities of polymer, and the whole system is then maintained at lower temperatures for a longer period of time, it is possible to obtain all the advantages described about, together with very high polymerization yields. This is the principle of the two stage polymerization of the present invention. The employment of a higher pressure and longer reaction period in the second stage than in the first stage assures high conversion of monomer to polymer in spite of the lower reaction temperature.

This type of polymerization at varying temperatures is thought to tend to have a selective influence on the rate at which the radicals form with the decomposition of the catalyst, on the rate of addition of the first monomeric units, and on the rate at which the long polymeric chains are forced. (An indirect illustration of the correctness of this theory is furnished by the fact that polymers obtained through this temperature cycle with higher transformation yields possess particularly high molecular weights, with a high density and degree of crystallinity.)

Lastly, in the case of olefines which when polymerized give strongly hydrophobic polymers, the polymer tends as soon as it is formed to collect separately from the water, and only by means of violent agitation is it possible to assure the dispersion of the polymer in the dispersing medium. However, it is found according to the present that when the polymerization takes place in the presence of very small quantities of substances, whether or not these have catalytic properties (i.e., are initiators), containing in their molecules strongly hydrophilic atoms or atomic groups, such substances can become fixed as final groups of the polymer through a chain transfer mechanism, with the result that the polymer possesses excellent wetability and thus lends itself to an easier and more even dispersion in the dispersing medium, without detriment to its basic properties. These substances are described above.

Polymerization of the olefine leads in any case to a polymer which may range in form from granular to an amorphous powdery substance, perfectly separated from the dispersion medium and therefore easily recovered. This product has a high purity, due to the fact that both the small quantities of initiator used, whether dissolved in the dispersion medium or in the dispersed phase, and the substances added to lower the hydrophobicity of the polymer, become chemically combined in the final polymer, and the quantity of these substances, in proportion to the amount of polymer formed, is negligible.

The following examples illustrate some embodiments of the invention, but the invention is not restricted to these examples.

EXAMPLE I

Into an autoclave provided with a rapidly rotating stirrer and containing at 75° C. 400 parts of water and 10 mols of diethylene triamine per million mols of ethylene to be introduced, 63 parts of ethylene and 0.04 mol percent, based on the ethylene, of di-isopropyl-peroxy-dicarbonate are introduced. The pressure in the autoclave thereby is brought to 350 atmospheres; the temperature is maintained at 75° C. The system is kept at these conditions for 15 minutes; then, the temperature is lowered to 55° C. and at the same time the pressure is raised to 550 atmospheres and held constant with successive recharges of ethylene for 120 minutes. In this way 44 parts of polyethylene in powder form are obtained, by filtration of the resulting final dispersion, having the following properties:

| | |
|---|---|
| Average molecular weight | 150,000 |
| Density | .942 |
| Vicat softening point, ° C. | 117 |

EXAMPLE II

A stainless steel autoclave is charged with about 300 parts of distilled and deaerated water containing .3% by weight of partially hydrolyzed polyvinyl acetate. Then the solution is brought up to 65° C. and subsequently 144 parts of ethylene and .01 mol percent, based on the ethylene, of cyclohexane sulphonyl-acetyl-peroxide are added whereby the pressure is increased to a value of 400 kg./cm.$^2$. The system is kept at these conditions for 5 minutes, and with violent stirring. Then the temperature is lowered to 40° C. and at the same time the pressure is increased to 600 kg./cm.$^2$. This pressure and temperature are kept constant, through successive recharges, for 60 minutes, after which the autoclave is unloaded. In this way, 21 parts of polyethylene are obtained, by filtration of the resulting final dispersion, having the following properties:

| | |
|---|---|
| Average molecular weight | 235,000 |
| Density | .948 |

EXAMPLE III

An AISI 316 steel autoclave provided with a rapidly rotating stirrer and kept at 70° C. by means of a jacket, is charged with 300 parts of water, .05 mol percent, based on the ethylene to be charged of isopropyl carbonate-peroxy-sodium sulphonate and 168 parts of ethylene, thereby reaching a pressure of 375 kg./cm.$^2$. After 10 minutes the temperature is lowered to 48° C. and at the same time the pressure is brought up to 575 kg./cm.$^2$. This pressure and temperature are kept constant through subsequent recharges of ethylene for a period of 90 minutes. Then, unloaded from the autoclave is the final dispersion from which is obtained, by filtration, 90 parts of polyethylene having the following properties:

| | |
|---|---|
| Average molecular weight | 190,000 |
| Density | .945 |

EXAMPLE IV

A stainless steel autoclave, kept at 75° C., is charged with 400 parts of distilled and deaerated water, containing .10 mol percent, based on the ethylene to be charged of phenyl-acetyl peroxide and 20 mols of tripropylene tetra-amine per million mols of the ethylene to be charged, and with 57 parts of ethylene. For 15 minutes and with violent stirring, the charge is maintained at the above temperature and at a pressure of 350 kg./cm.$^2$. Then, the system is brought to a temperature of 40° C. and to a pressure of 600 kg./cm.$^2$ and kept at these conditions, by means of successive recharging of ethylene, for 60 minutes. Then, unloaded from the autoclave is the final dispersion from which is obtained, by filtration, 35 parts of polyethylene, having the following properties:

| | |
|---|---|
| Density | .948 |
| Melt index | .05 g./10 min. |
| Crystallinity (percent) | 80 |

EXAMPLE V

Into a stainless steel autoclave 300 parts of water at 95° C. are introduced, containing .1% by weight of dissolved polyacrylic acid together with .08 mol percent mol. of diethyl-peroxy-dicarbonate, based on the ethylene to be introduced, and 43 parts of ethylene until a pressure of 300 kg./cm.$^2$ is reached. The system is kept at these conditions for a period of 20 minutes and violently stirred. Then, the temperature is lowered to 60° C. and at the same time the pressure is increased to 600 kg./cm.$^2$. This pressure is kept constant with subsequent recharges of ethylene and the temperature also is kept constant for a period of 150 minutes. Then, from the autoclave is emptied the final dispersion from which is obtained, by filtration, 54 parts of polyethylene having the following properties:

| | |
|---|---|
| Average molecular weight | 120,000 |
| Density | .938 |
| Ultimate elongation (percent) | 400 |

The invention is not to be construed as being limited to the particular embodiments disclosed herein, since these are intended to be illustrative rather than resrtictive.

What I claim and desire to secure by Letters Patent is:

1. Process for the production of polyethylene having a high molecular weight and high degree of crystallinity comprising providing a dispersion of ethylene in water, said dispersion containing in a concentration in the range of 0.01 mol to 0.10 mol per 100 mols of ethylene of a free radical polymerization initiator having an activation energy in the range of 15 to 25 kcal./mol and containing in a concentration of 5 to 20 mols per million mols of ethylene a substance having a hydrophilic group, in a first stage for a period of time in the range of 2 to 20 minutes maintaining the temperature of said dispersion in the range of 60 to 95° C. and the pressure of said dispersion in the range of 300 to 400 kg./cm.$^2$, and subsequently in a second stage for a longer period of time in the range of 30 to 150 minutes maintaining said dispersion at a lower temperature in the range of 40 to 60° C. and at a higher pressure in the range of 500 to 600 kg./cm.$^2$, said dispersion being agitated continuously during said first and second stages.

2. Process according to claim 1, in which the initiator has a hydrophilic group, and said hydrophilic group becomes associated with ethylene polymer formed during the first stage to form a dispersable ethylene prepolymer.

3. Process according to claim 1, in which said substance having a hydrophilic group becomes associated with ethylene polymer formed during the first stage to form a dispersable ethylene prepolymer.

4. Process according to claim 1, in which for the first stage the period of time is in the range of 5 to 15 minutes and the temperature and the pressure at which the dispersion is maintained are in the respective ranges of 65 to 75° C. and 350 to 400 kg./cm.$^2$.

5. Process according to claim 1, in which for the second stage the period of time is in the range of 60 to 120 minutes and the temperature and the pressure at which the dispersion is miantained are in the respective ranges of 40 to 55° C. and 550 to 600 kg./cm.$^2$.

6. Process for the production of polyethylene having a high molecular weight and high degree of crystallinity comprising providing a dispersion of ethylene in water, said dispersion containing in a concentration in the range of 0.01 mol to 0.10 mol per 100 mols of a free radical polymerization initiator having an activation energy in the range of 15 to 25 kcal./mol and having a hydrophilic group, in a first stage for a period of time in the range of 2 to 20 minutes maintaining the temperature of said dispersion in the range of 60 to 95° C. and the pressure of said dispersion in the range of 300 to 400 kg./cm.$^2$, and subsequently in a second stage for a longer period of time in the range of 30 to 150 minutes maintaining said dispersion at a lower temperature in the range of 40 to 60° C. and at a higher pressure in the range of 500 to 600 kg./cm.$^2$, said dispersion being agitated continuously during said first and second stages.

References Cited

UNITED STATES PATENTS

| 3,380,945 | 4/1968 | des Deex | 260—94.9 |
| 3,352,807 | 11/1967 | Helin et al. | 260—94.9 |
| 3,226,352 | 12/1965 | Helin et al. | 260—94.9 |
| 2,396,677 | 3/1946 | Brabaken | 260—94.9 |

JOSEPH L. SCHOFER, Primary Examiner

E. J. SMITH, Assistant Examiner